United States Patent [19]
Adams et al.

[11] Patent Number: 5,314,203
[45] Date of Patent: May 24, 1994

[54] DRIVER-SIDE MODULE ATTACH BRACKET

[75] Inventors: Gary V. Adams, Brigham City; Bradley W. Smith, Ogden, both of Utah

[73] Assignee: Morton International, Inc., Chicago, Ill.

[21] Appl. No.: 820,826

[22] Filed: Jan. 15, 1992

[51] Int. Cl.⁵ .............................................. B60R 21/16
[52] U.S. Cl. ................................. 280/728 A; 280/731
[58] Field of Search .......... 280/731, 736, 741, 728 A, 280/732, 728 R

[56] References Cited

U.S. PATENT DOCUMENTS

| | | | |
|---|---|---|---|
| 4,101,146 | 7/1978 | Dehm | 280/731 |
| 4,325,568 | 4/1982 | Clark et al. | 280/731 |
| 4,938,503 | 7/1990 | Muraoka et al. | 280/731 |
| 5,024,464 | 6/1991 | Kawaguchi et al. | 280/731 |
| 5,044,663 | 9/1991 | Seizert | 280/731 |

Primary Examiner—Eric Culbreth
Attorney, Agent, or Firm—Gerald K. White

[57] ABSTRACT

The invention facilitates fixedly attaching to vehicle steering wheels different or variously styled driver restraint modules, while incorporating common major module components. For example, three (3) different modules use the same major module components (reaction plate, inflator, and folded air bag) but utilize different brackets for steering wheel mounting and adaptation to the styling locations of selected ones of the variously styled driver module assemblies for horn blowing, speed control, etc. This makes it possbile to use more common production tooling, i.e., for cover attachment, bag folding, etc., thus enabling manufacturing cost reduction.

2 Claims, 9 Drawing Sheets

DRIVER-SIDE MODULE ATTACH BRACKET

BACKGROUND OF THE INVENTION

1. Field of the Invention

This invention relates to inflatable type occupant restraint systems for use on the driver side of automotive and other vehicles wherein an air bag is inflated very quickly in the event of a collision to restrain and thereby protect the driver from injury that could result from being forcibly thrown against the steering wheel, dashboard, etc.

2. Description of the Prior Art

Occupant restraint systems of the inflatable type for protecting the driver of an automotive vehicle are well known. Generally, such systems include a fluid source such as a pressurized stored gas, a solid propellant gas generator or a hybrid (a combination of the above). The fluid source may be mounted on the steering wheel or the steering column of the vehicle and is connected in communicating relation to the air bag to be inflated. A collision sensor for actuating the fluid source in response to the onset of a collision may be mounted adjacent thereto or at an appropriate remote location.

It is known in the prior art to embody a driver side occupant restraint system in a modular construction. A modular construction or module assembly is characterized by the ease of installation thereof in the vehicle and removal as a unit. The module assembly includes all of the major components required to provide an inflatable occupant restraint system including backup or reaction plate, a gas generator or inflator, an air bag in a folded, non-inflated condition for instant deployment in the event of a collision, and a cover or housing for the reaction plate, gas generator and the air bag. The cover is provided with an upper wall that is frangible, through which wall the air bag, when expanded, is deployed. For the attachment of the module assembly to the steering wheel, as disclosed in U.S. Pat. No. 3,819,205 issued on Jun. 25, 1974 or in U.S. Pat. No. 5,002,306 issued on Mar. 26, 1991, typically a plurality of tabs or support plates connect the core of the steering wheel to the reaction plate.

Module assemblies and steering wheels to which they are to be attached are provided in a variety of different styles or ornamental arrangements for utilitarian, aesthetic or other reasons, as determined by the vehicle manufacturers. This has brought about inefficiencies in the use of production tooling and in the assembly procedures in the module manufacturing process. The elimination of such inefficiencies has given rise to a need for a simple and efficient means for attaching and securing to the different steering wheels each of the differently styled module assemblies while allowing the incorporation in the module assemblies of common major module components to reduce cost.

Thus, there exists a need and a demand for improvement in the means for attaching and securing to the steering wheels of automobiles or other vehicles differently styled driver module assemblies, while incorporating common components of the modules thereby to allow for the use of more common production tooling and enabling a reduction in the manufacturing cost. The present invention was devised to fill the technological gap that has existed in the art in these respects.

SUMMARY OF THE INVENTION

An object of the invention is to provide a simple and efficient means for attaching and securing to the different steering wheels of automotive vehicles differently styled driver restraint module assemblies while incorporating therein common major module components.

Another object of the invention is to enable most of the manufacture and assembly for a plurality of differently styled modules to be universalized, that is, to be accomplished in common, thereby allowing for the use of more common production tooling, the assembly of all of the differently styled driver restraint modules on the same assembly line, and consequently, a reduction in the manufacturing cost.

A further object of the invention is to provide for use with each of the differently styled modules a different bracket that is individual thereto for the mounting of each such module on an associated selectively different one of the steering wheels, which bracket is characterized in having a common means of attachment to all of the differently styled module assemblies but providing attach points for mounting to the associated one of the steering wheel and adapting to the styling locations for the various module assemblies for horn blowing, etc.

Still another object of the invention is to provide a driver module attach bracket for fixedly attaching to the steering wheel of a vehicle different styled driver restraint module assemblies, which assemblies are characterized by the incorporation therein of common major components comprising a reaction plate, an inflator, and an air bag and the provision of a plurality of common attach points on the reaction plate for the selective attachment thereof to the bracket, the bracket, in turn, being characterized in the incorporation therein of a plurality of attach points that are common to the attach points of each of the different styled module assemblies and suitable for the attachment thereto of each of the different styled module assemblies, the bracket being further characterized in the selective incorporation therein of other attach points that are unique to the styling locations of an individual one of the various styling arrangements of the different styled driver restraint module assemblies for horns and other driver actuated devices such as speed controls, and additionally, the bracket being further characterized in the selective incorporation therein of attach points unique to the locations of the attach points provided on the steering wheel on which the individual one of the different styled restraint module assemblies is to be mounted.

In accomplishing these and other objectives of the invention, a bracket is provided that is tailored to the steering wheel to which a stylized driver restraint module assembly is to be mounted and secured, being configured to adapt to the styling locations of the latter for horn blowing, etc. More specifically, the bracket is characterized and configured so as to provide means for the following:

1. attach points for steering wheel mounting;
2. for retention of the module assembly cover;
3. mounting provisions for horn switches through cover and under cover type, as well as providing grounding means for the switch;
4. mounting provisions for speed controls, radio controls, etc.;
5. stiffening ribs where required for rigidity;

6. provisions for aligning the module assembly to the steering wheel (two (2) studs) which also help mount the bracket and reduce deflections during vibration; and 7. four inflator mounting studs for primary structural attachment of the bracket to the module assembly.

It will be noted that the features set forth in items 2, 5 and 7 of the foregoing list are common to each of the differently styled driver restraint module assemblies.

As those skilled in the art will understand, there is no impediment to the manufacture on the same production line of the various brackets that are required for the different steering wheels. All of the brackets share a major common feature having to do with the attachment thereof to the differently styled module assemblies. More specifically, the brackets are characterized in having four (4) mounting holes for the attachment thereof to each of the differently styled modules and for the retention of the module cover or housing. At the extremities thereof, the bracket has a configuration unique to the different steering wheels with which it is to be used and to the individual one of the differently styled module assemblies.

The fact that the brackets can all be manufactured on the same production line allows for more common production tooling and contributes to greater efficiency and reduced cost. This together with the use of module assemblies that, although styled differently can be manufactured and assembled on the same assembly line as above described, enables increased efficiency and reduction in cost.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which.

DESCRIPTION OF THE PREFERRED EMBODIMENTS

Figure 1:
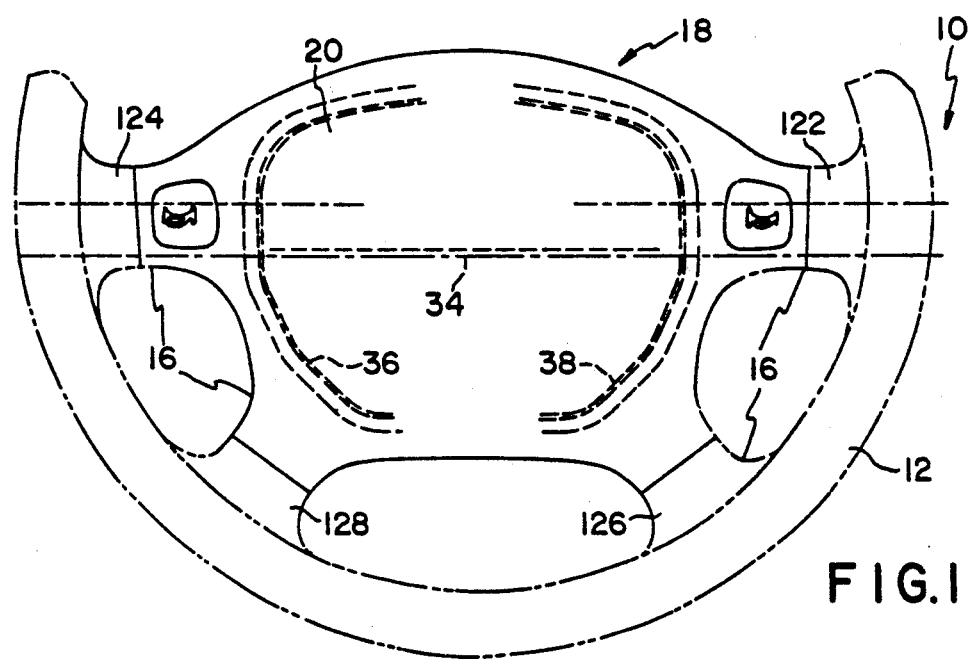
FIG. 1 is a view of the assembly of a first embodiment of the invention mounted to a first steering wheel.

In the embodiment of the invention shown in FIGS. 1 through 8, a steering wheel 10 includes a ring portion 12, a boss portion 14 arranged at the center of the ring portion 12, and spoke portions, collectively designated 16, connecting the ring portion 12 to the boss portion 14. A driver restraint module assembly 18 is installed on the upper side of the boss portion 14, being fixedly attached to the spoke portion 16.

Figure 3:
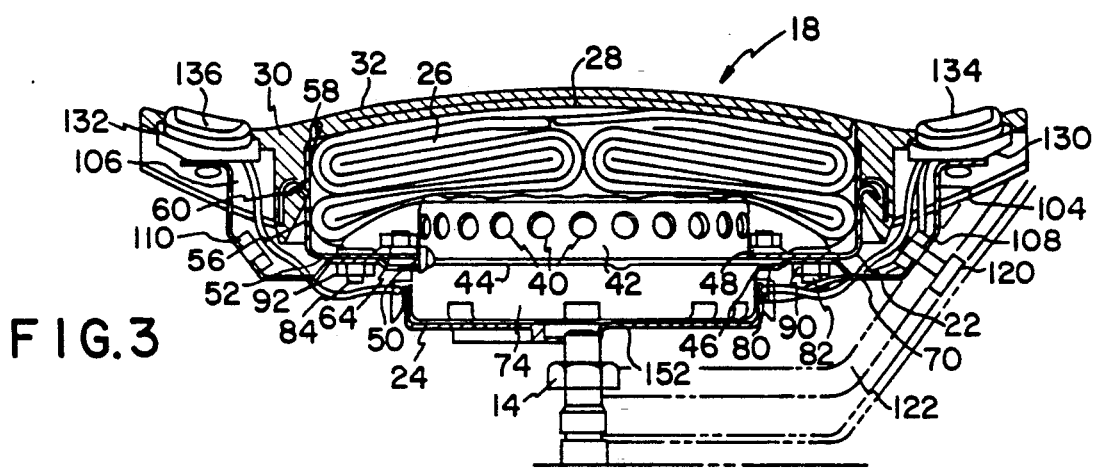
FIG. 3 is a partial sectional view of the assembly taken along the lines 3—3 of FIG. 5.

The driver restraint module 18 is encapsulated in a cover or housing 20 and includes a reaction plate 22, a gas generator or inflator 24, and an air bag 26 that normally is folded and fills the space between the inflator 24 and the inner walls of the cover 20, as best seen in FIG. 3.

The cover 20 is formed in a generally oblong, stylized shape and includes an upper wall 28 and a side wall 30 extending downward from the periphery of the upper wall 28, the upper wall 28 being thinner than the side wall 30. The cover 20 may be made of of two kinds of material, specifically solid internal reinforcement material which may be composed of injection molded thermoplastic material such as that commercially available from Celanese under the trademark RITEFLEX and soft outer cover material such as urethane, vinyl and polyester. The soft outer cover material includes an outer upper decorative cover 32 for the upper surface of the upper wall 28. The remaining portions of the cover 20 are made of solid reinforcement material.

As shown in FIGS. 1 and 3, the upper wall 28 is provided with tear seams 34, 36 and 38 which form a generally H-like shape. The tear seam 34 is approximately centered on the upper wall 28 and runs parallel to the long axis of the oblong shape thereof. Each of the tear seams 36 and 38 runs generally perpendicular to an individually associated end of the tear seam 34 and generally conforms to the curved periphery of the adjacent side of the decorative cover 32 on the upper surface of the upper wall 28.

When initiated, as in response to the onset of a collision, the inflator 24 generates gas to inflate and expand the air bag 26 to a generally spherical form. To that end a plurality of radial gas exit ports 40 are provided in the upper wall portion 42 of the inflator 24. A generally annular flange 44 on an intermediate portion of the inflator 24 facilitates the attachment of the latter to the plate 22 and the gas inlet port or opening 46 of the air bag 26. Opening 46 is defined by a circular retainer band or ring 48. Ring 48 can be made out of any suitable metal, such as aluminum or steel, with steel being preferred for strength and rigidity. A plurality of suitably spaced fastener holes (not shown) pass through the body of the ring 48.

The reaction plate 22 is generally rectangular and deep dish-like in shape and has a generally circular opening 50 in the bottom 52 thereof, into which opening 50, from the lower side thereof as seen in the drawing, the upper wall portion 42 of the inflator 24 but not the flange 44, may be inserted. A plurality of spaced fastener holes (not shown) pass through the bottom 52 of the reaction plate 22. The opening 50 in the reaction plate 22 is substantially the same in size as the opening in the ring 48 that defines the gas inlet opening 46 of the air bag 26. Additionally, the plurality of holes in the plate 22 are so positioned as to be in alignment with the plurality of holes in the ring 48 when superposed in a given angular relation.

Fasteners 54 are inserted through some (typically eight) of the holes in ring 48. Rivets or bolts may be used, with clinch fit bolts pressed into place in the ring 48 being preferred. The ring 48 is then inserted through the gas inlet opening in the air bag 26. The fasteners 54 are inserted through fastener holes (not shown) that are provided in the air bag 26 in the peripheral area thereof adjacent the opening 46. The reaction plate 22 is then placed in abutting relation with the air bag 26 with the opening 50 in aligned relation with the gas inlet opening 46 in the air bag 26. The fasteners 54 pass through the holes in the reaction plate 22 and clamp a portion of the area of the air bag 26 peripheral to the gas inlet opening 46 therein between the ring 48 and the reaction plate 22.

Reaction plate 22, as best indicated in FIG. 3, includes an upstanding cylindrical wall 56 which surrounds and supports the air bag 26, in then normally folded condition, when the peripheral region adjacent the gas inlet opening therein is clamped between the ring 48 and the reaction plate 22.

In the further assembly of the driver restraint module 18, the cover 20 is placed over the folded air bag 26 and reaction plate 22 with the generally cylindrical wall 56 of the latter fitting in close engagement with the inner wall surface 58 of the side wall 30 of the cover 20. The upper edge of the cylindrical wall 56 may be curled outwardly forming a rolled-over lip 62, as shown in FIG. 3, for engaging and being locked in mating relation in a groove 60 in the side wall 30 of cover 20 when the reaction plate 22 and the folded air bag 26 are pressed in place within cover 20.

The folded air bag 26 and reaction plate 22 are also held in attached relation during the assembly of the driver restraint module 18 by a plurality of fasteners or bolts 64. Fasteners 64, of which, typically, there are four, extend through equally spaced holes (not shown) in ring 48, similarly spaced holes (not shown) in air bag 26, and similarly spaced holes 66 in the reaction plate 22. Holes 66 may be made undersized so as to grip the walls of the fasteners 64. The folded air bag 26 is held securely and firmly between the reaction plate 22 and the cover 20 during the remainder of the assembly process of the driver restraint module 18 without the need for more secure closure means such as nuts or the like.

An attach bracket 70, as shown in FIGS. 2-4 and 6 has a generally circular opening 72 therein into which a bottom portion 74 of the inflator 24 fits but not the flange 44 thereof. A plurality of spaced holes 76 are provided in the flange 44 which are in alignment with the holes 66 in the reaction plate 22. A plurality of similarly spaced holes 78 in alignment with the holes 76 in flange 44 and with the holes 66 in the reaction plate 22 are provided in the bracket 70.

The assembly of the driver restraint module is continued by inserting the upper wall portion 42 of the inflator 24 through the opening 50 in the reaction plate 22 with the inflator 24 so angularly positioned with respect to the reaction plate 22 that the bolts 64 extend through the holes 76 in the flange 44. The bracket 70 is then placed over the inflator 24, that is, the bottom portion 74 of the inflator 24 is passed through the opening 72 thereof, with the angular position of the bracket 70 relative to the inflator 24 being such that the bolts 64 extend through the holes 78. For fixedly attaching the inflator 24 and the bracket 70 to the driver restraint module 18, nuts 80 are applied to each of the bolts 64 and fastened tightly thereon.

Figure 6:
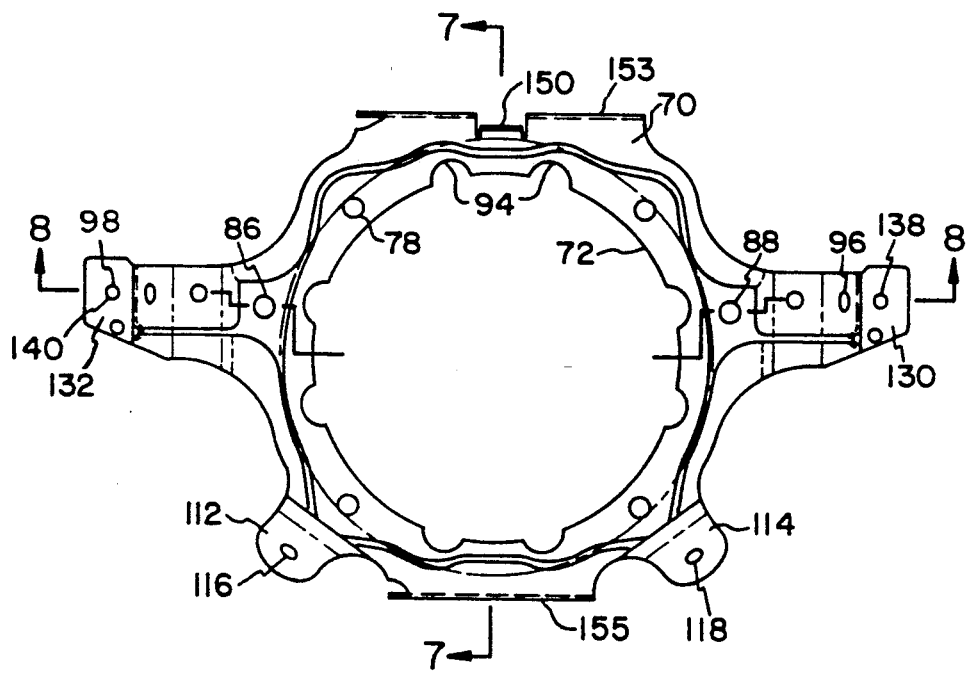
FIG. 6 is a bottom view of a first bracket according to the invention having utility for mounting the assembly of FIG. 1 to the first steering wheel.

As best seen by reference to FIGS. 3 and 6, bracket 70 is also attached to the reaction plate 22 by two bolts which are designated 82 and 84. Bolts 82 and 84 pass through holes (not shown) in reaction plate 22 and through respectively associated holes 86 and 88 in bracket 70. Nuts 90 and 92 fastened to bolts 82 and 84, respectively, securely fasten bracket 70 to the reaction plate 22 with the flange 44 of the inflator 24 clamped therebetween.

Figure 5:
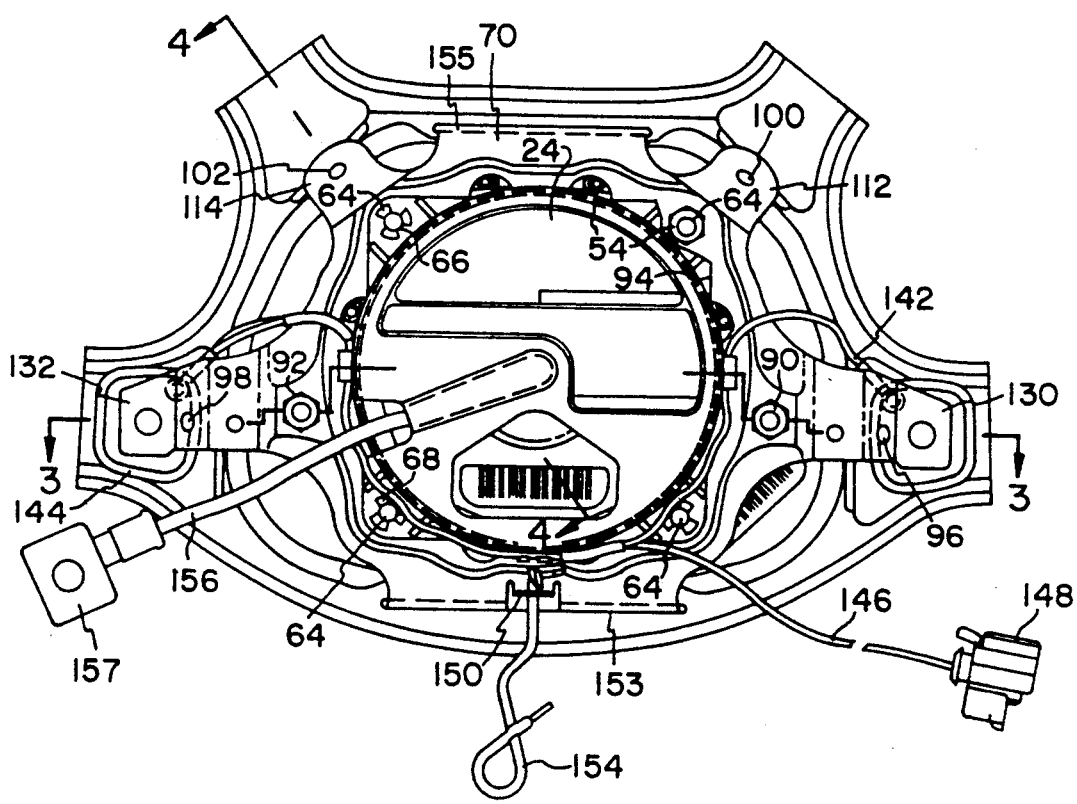
FIG. 5 is a bottom view of the assembly of FIG. 1.

As best seen in FIGS. 5 and 6, a plurality of spaced half moon shaped cutouts 94 are provided in the periphery of the circular opening 72 in the bracket 70 to provide space for the fasteners 54 to extend, which fasteners 54 attach the ring 48 to the air bag 26.

Figure 4:
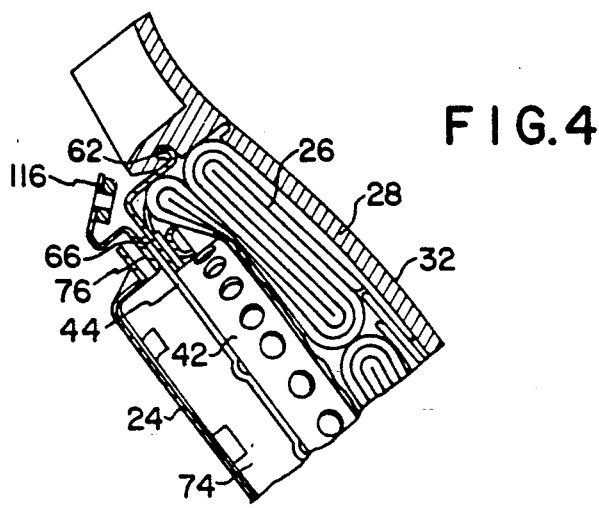
FIG. 4 is a partial sectional view of the assembly taken along the lines 4—4 of FIG. 5.
Figure 2:
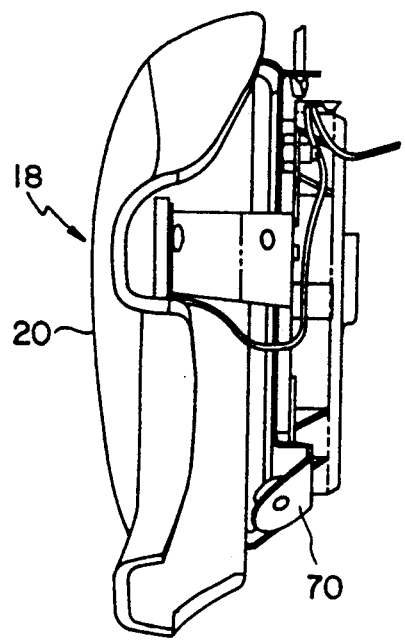
FIG. 2 is a side view of the assembly of FIG. 1.

Bracket 70 is generally rectangular and deep dish-like in shape, as shown in the drawings, and provides four attach points for attaching the driver restraint module assembly 18 to the steering wheel 10. The attach points are shown at 96, 98, 100 and 102 in FIG. 5. Attach points 96 and 98 are formed on opposed upstanding wall portions 104 and 106, respectively, of bracket 70 and comprise, respectively, a mounting nut 108 formed in wall portion 104 and a mounting nut 110 formed in wall portion 106. Nuts 108 and 110 may be welded to or made integral with the bracket wall portion that is individual thereto. Similarly, attach points 100 and 102 are formed on opposed upstanding wall portions 112 and 114, respectively, of bracket 70, and comprise nuts 116 and 118, as shown in FIG. 4, that are formed, respectively, in wall portions 112 and 114.

Bolts extend through the cores of spokes 122 and 124 of steering wheel 10 and are screwed into the nuts 108 and 110, bolt 120 only being shown in FIG. 3 as being screwed into nut 108. Similarly, a bolt (not shown) extends through the core of each of spokes 126 and 128 of steering wheel 10 and is screwed into an individually associated one of nuts 116 and 118 on the wall portions 112 and 114, respectively, of bracket 70. Nuts 116 and 118 may be welded to or otherwise formed integrally with the wall portions 112 and 114.

Attachment of the bracket 70 to the steering wheel 10 at the four attach points 96, 98, 100 and 102 in the manner described fixedly attaches the driver restraint module 18 to the steering wheel 10.

Figure 8:
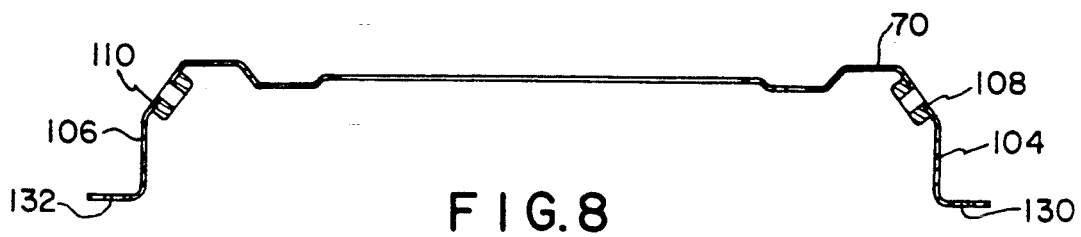

In addition to providing for the mounting of the driver restraint module 18 to the steering wheel 10, the bracket 70 facilitates adaptation to the styling locations of various styles or ornamental arrangements for horns or other control devices for acutation by the driver that it is desired to incorporate in the module assembly. Thus, as shown in FIGS. 3, 5 and 8, the bracket 70 includes opposed portions 130 and 132 on which are positioned at the upper end of upstanding portions 104 and 106, respectively, horn switch assemblies 134 and 136. Holes 138 and 140 provided in bracket portions 130 and 132, as shown in FIG. 5, facilitate such mounting. Lead wires 142 and 144 connect the horn assemblies 134 and 136 to a conductor 146 which, in turn, is adapted to be connected by a connector 148 to a horn actuating circuit within the vehicle.

A wire protector 152 is provided on the lower portion 74 of the inflator 24, as shown in FIG. 3.

A tie cord 154 is attached to a tab 150 provided on bracket 70, as shown in FIG. 5, being attached thereto by insertion through a hole in the tab 150 and the formation of an overhand loop in the tie cord 154 on the inner side of the tab 150.

Figure 7:
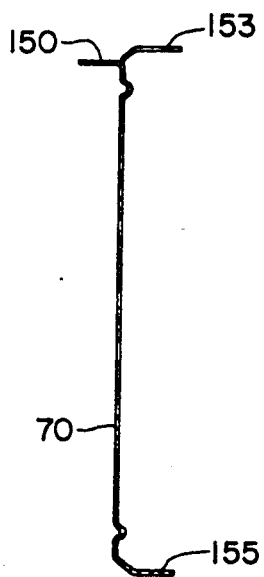
FIGS. 7 and 8 are views taken along the lines 7—7 and 8—8, respectively, of FIG. 6.

The tie cord 154 is provided to facilitate withdrawal of the module 18 from the steering wheel 10 during disassembly thereby avoiding the possibility of a workman pulling on the electrical wires provided in the module. Tangs 153 and 155 provided on bracket 70, as seen in FIG. 7, hold the cover 20 on in conjunction with the rolled-over lip 62 on the cylindrical wall 56 of reaction plate 22. The tangs 153 and 155 keep the groove 60 from slipping during deployment of the air bag 26.

For actuating the inflator 24 responsively to the onset of a collision, a cable 156 connects a squib (not shown) in the inflator 24 to a connector is connected by means (not shown) to a collision sensor (not shown) that may be positioned adjacent to or at a location in the vehicle remote from the inflator.

A second embodiment of the invention is illustrated in FIGS. 9–15 wherein a steering wheel 158 includes a ring portion 160, spoke portions collectively illustrated at 162, and a boss portion 164. Installed at the upper side of the boss portion 164, fixedly attached to the spoke portions 162 is a driver restraint module assembly 166.

The driver restraint module assembly 166, in accordance with the invention, embodies the major components of the module 18 of the first embodiment thereof illustrated by reference to FIGS. 1–8, specifically the reaction plate 22, the inflator 24 and the air bag 26, but utilizes a different bracket for the attachment thereof to the steering wheel.

Figure 9:
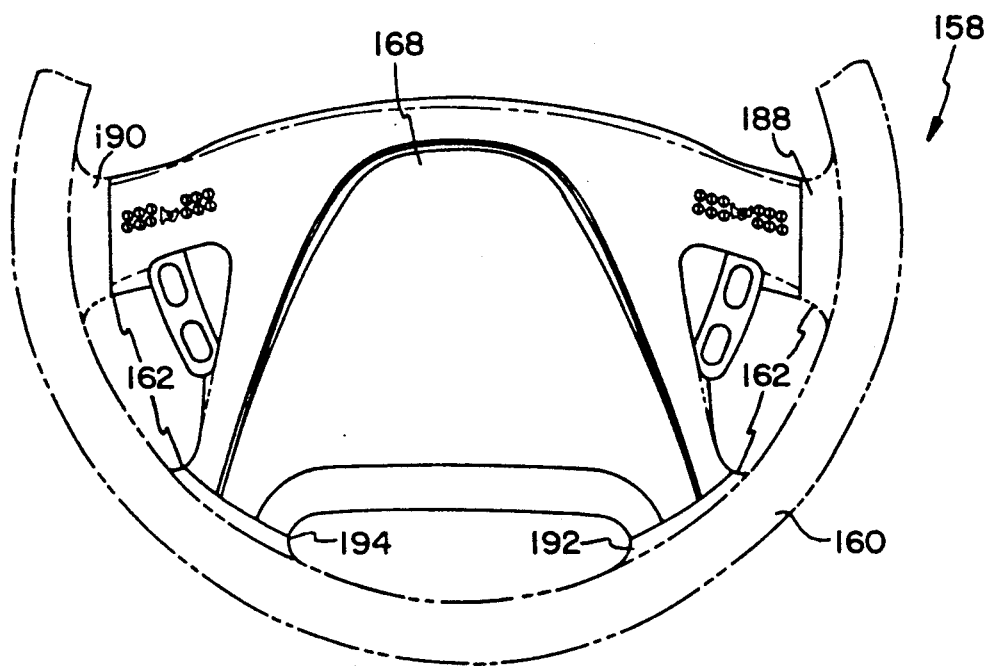
FIG. 9 is a view of the assembly of a second embodiment of the invention mounted to a second steering wheel.
Figure 10:
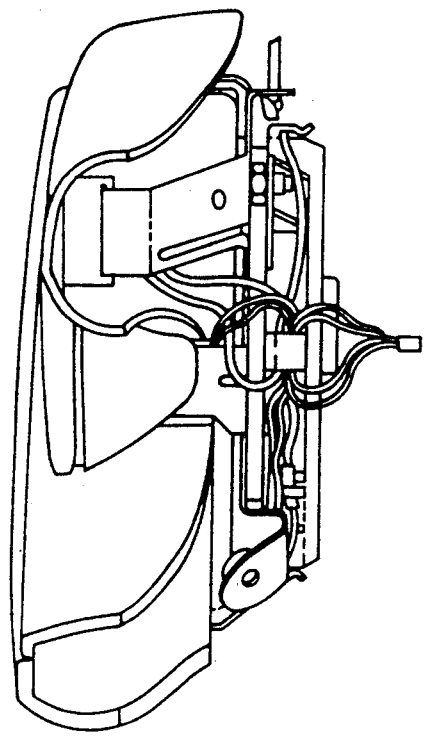
FIG. 10 is a side view of the assembly of FIG. 9.
Figure 11:
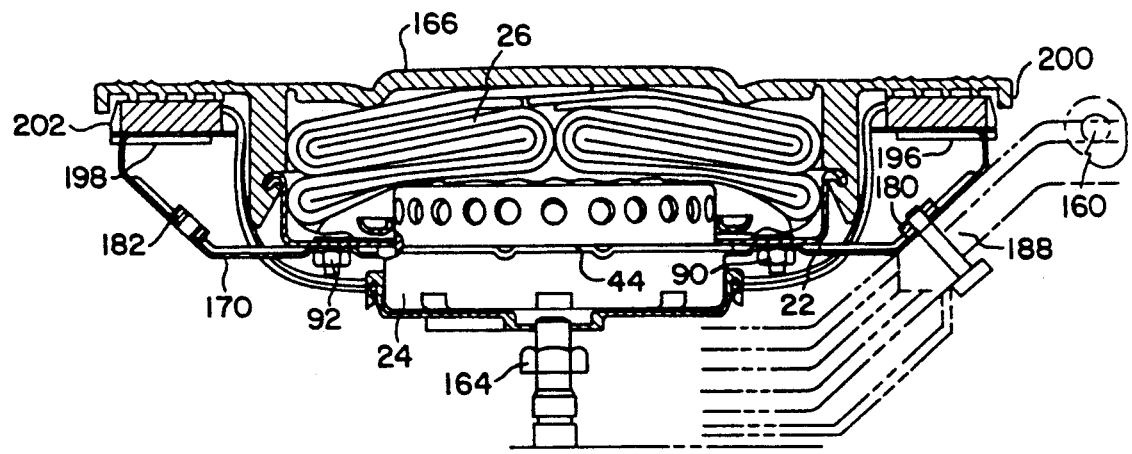
FIG. 11 is a partial sectional view of the assembly taken along the lines 11—11 of FIG. 12.

Thus, as shown in FIGS. 9, 10 and 11, the cover provided in the second embodiment of the invention, and designated by reference numeral 168, differs from the cover 20 of the first invention embodiment by the stylized configuration thereof, and additionally, by including portions that overlie horn assemblies and speed control assemblies.

The attach bracket provided for the attachment of the driver restraint module 166 to the steering wheel 158, and designated by reference number 170, differs in some respects from the bracket 70 of the first invention embodiment. While there are differences between the brackets 70 and 170, such differences consist largely in the adaptation thereof required to accommodate variations in the steering wheel and spoke arrangements of the vehicles and the horn blowing assemblies and the speed control assemblies. The bracket 170 is otherwise substantially identical to the bracket 70 in regard to the placement of the four attach points, designated 172, 174, 176 and 178, in the second embodiment, for attaching the module 166 to the bracket 170. Brackets 70 and 170 in their application are also identical in the placement thereof in overlying relation with the inflator 24 with the flange 44 thereof clamped between the bracket and the reaction plate 22 of the module.

For accommodating the module 166 for attachment to the steering wheel 158, four attach points are provided comprising mounting nuts welded to or formed integrally with the bracket 170 and indicated at 180, 182, 184 and 186. Bolts extend through the cores of spokes 188 and 190 and are screwed into the nuts 180 and 182. Similarly, bolts (not shown) extend through the cores of spokes 192 and 194 and are screwed into nuts 184 and 186. This arrangement fixedly attaches the module 166 to the steering wheel 158.

Figure 15:
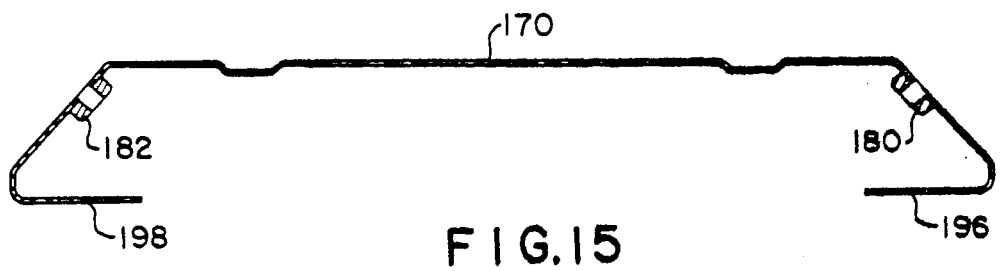

Bracket 170 differs further from bracket 70 in respect of inwardly formed portions, as shown at 196 and 198 in FIGS. 11 and 15. Portions 196 and 198 on bracket 170 provide supports for horn blowing assemblies 200 and 202, respectively.

Figure 12:
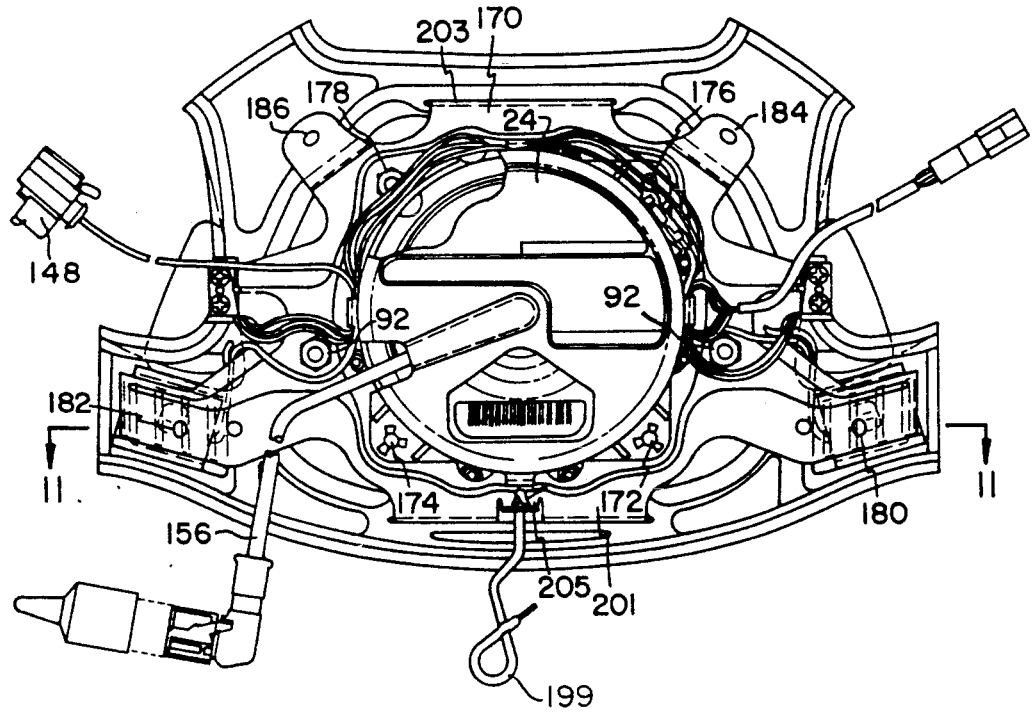
FIG. 12 is a bottom view of the assembly of FIG. 9.
Figure 13:
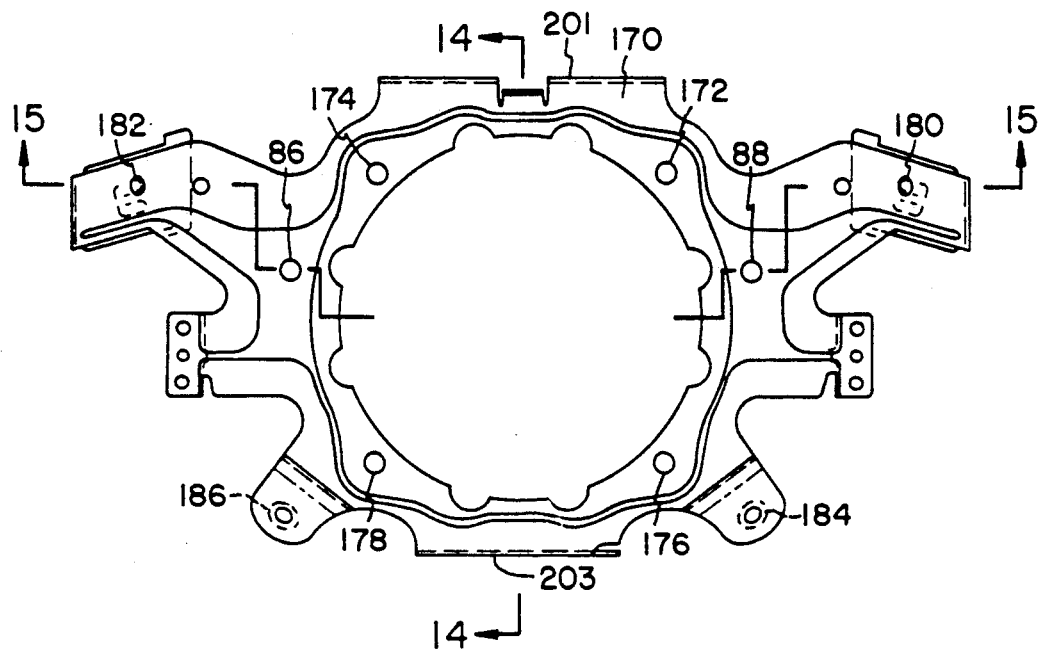
FIG. 13 is a bottom view of a second bracket according to the invention having utility for mounting the assembly of FIG. 9 to the second steering wheel.

A tie cord 199 is attached to a tab 205 provided on the bracket 170, as shown in FIG. 12. The function of the tie cord 199, similar to that of the tie cord 154 provided in the first embodiment of the invention, is to enable the module 168 to be pulled physically out of the mounting on the steering wheel 158 during disassembly without resorting to pulling on the electrical wires provided in the module.

Figure 14:
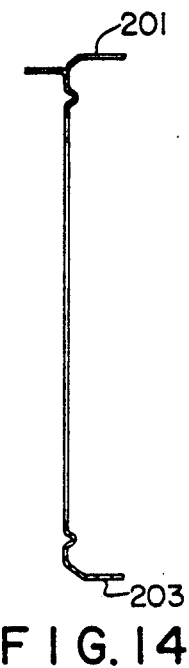
FIGS. 14 and 15 are views taken along the lines 14—14 and 15—15, respectively, of FIG. 13.

Bracket 170, as seen in FIG. 14, includes tangs 201 and 203 which serve a purpose that is substantially identical to the tangs 153 and 155 of bracket 70. Tangs 201 and 203 hold the cover 168 in conjunction with the rolled-over lip 62 in the cylindrical wall 56 of the reaction plate 22. The tangs 201 and 203 keep the groove 60 in the wall 56 from slipping during deployment of the air bag 26.

A third embodiment of the invention is illustrated in FIGS. 16–22 wherein a steering wheel 204 includes a ring portion 206, a boss portion 207 and spoke portions collectively designated 208. Fixedly attached to the spoke portions 208 at the upper side of the boss portion 207 is a driver restraint module assembly 210.

The driver restraint module 210, in accordance with the invention, embodies the major components of the modules 18 and 166 of the first and second invention embodiments, respectively, specifically the reaction plate 22, the inflator 24 and the air bag 26. The module 210, however, utilizes a different stylized cover and a different bracket for the attachment thereof to the steering wheel 204.

Figure 16:
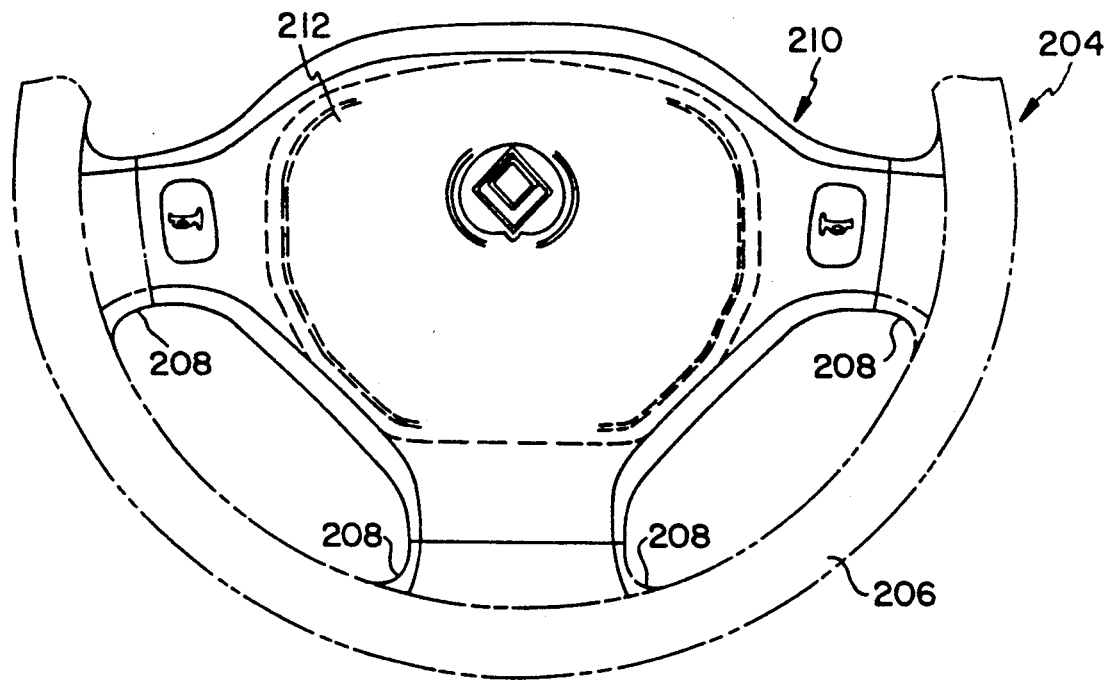
FIG. 16 is a view of the assembly of a third embodiment of the invention mounted to a third steering wheel.
Figure 17:
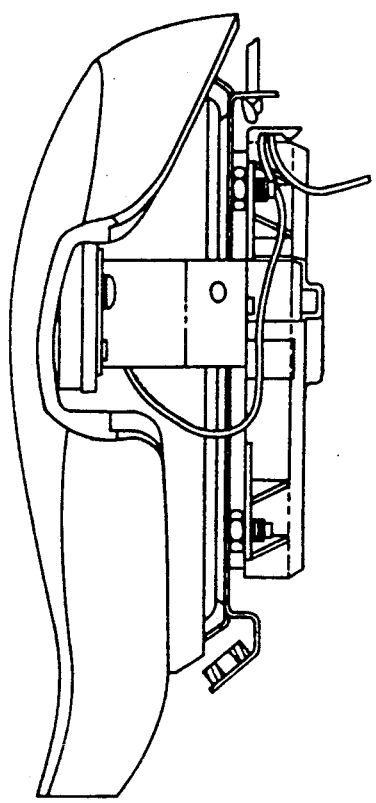
FIG. 17 is a side view of the assembly of FIG. 16.
Figure 18:
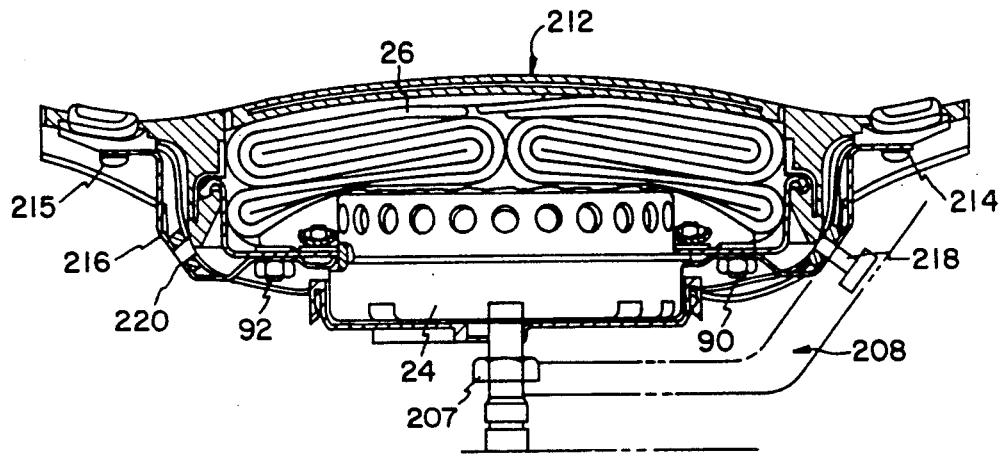
FIG. 18 is a partial sectional view of the assembly taken along the lines 18—18 of FIG. 19.
Figure 19:
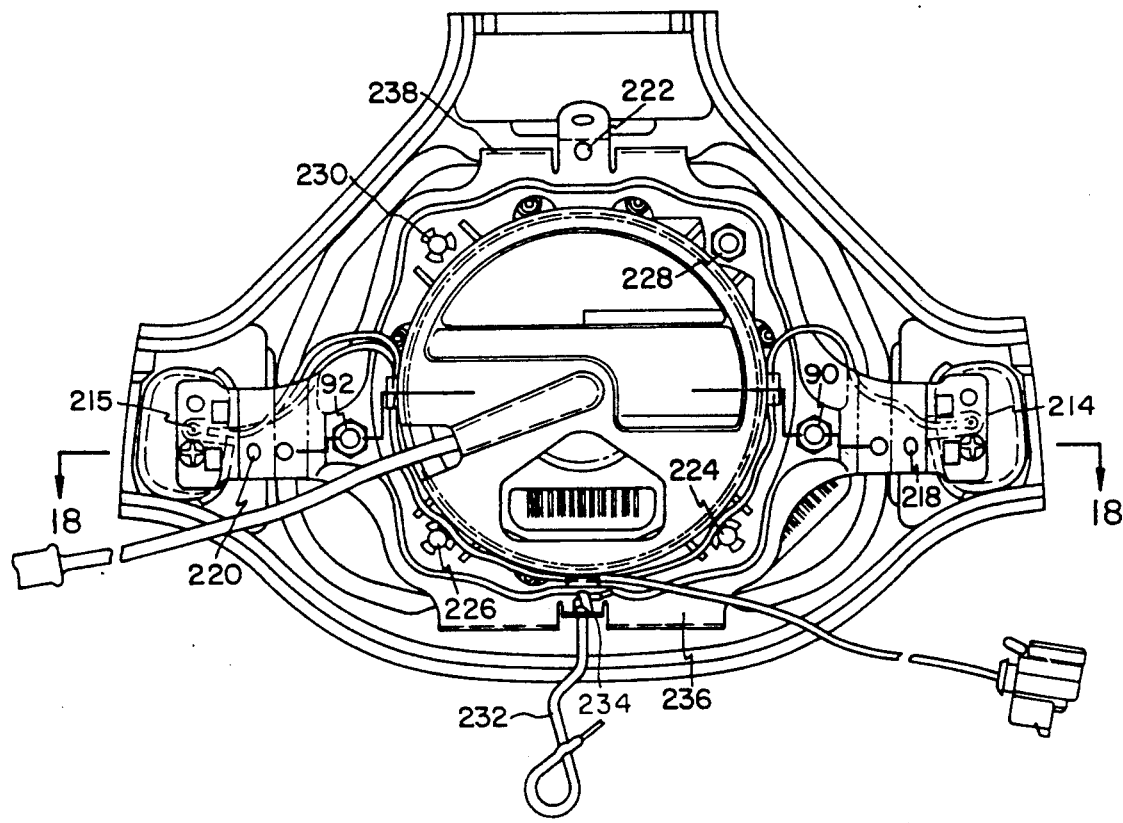
FIG. 19 is a bottom view of the assembly of FIG. 16.
Figure 20:
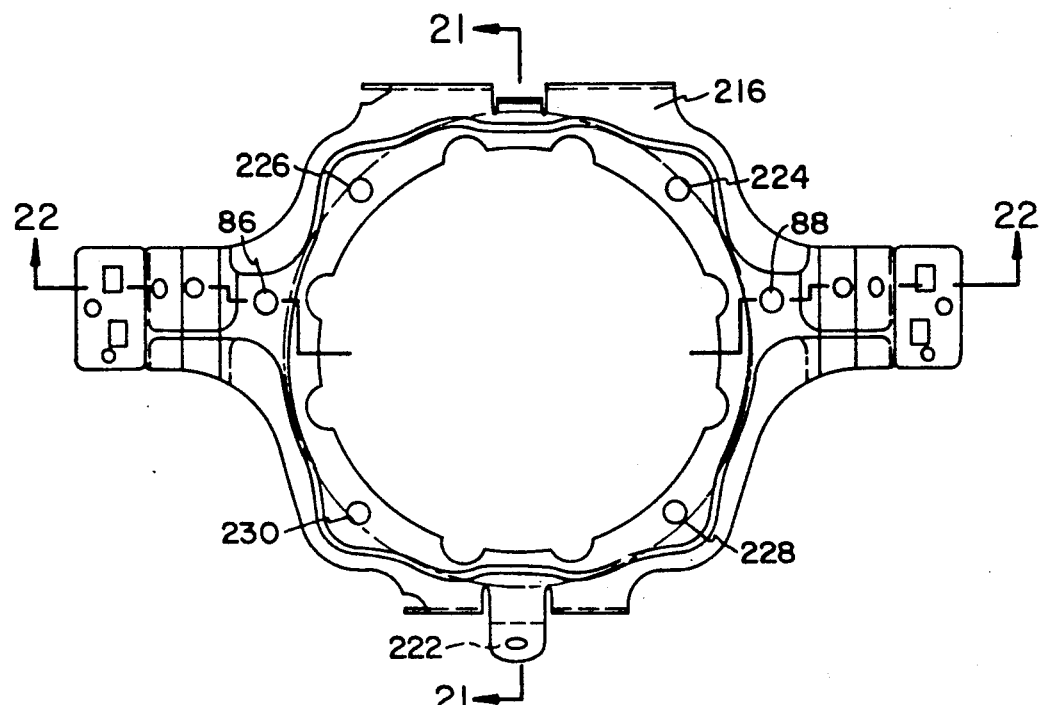
FIG. 20 is a bottom view of a third bracket according to the invention having utility for mounting the assembly of FIG. 16 to a third steering wheel.

As shown in FIGS. 16, 17 and 18, cover 212 that is provided in the third embodiment of the invention differs from the covers 20 and 168 of the first and second invention embodiments, respectively, by the stylized configuration thereof, and the provision for horn blowing assemblies 214 and 215.

The attach bracket, designated 216, provided for the attachment of the driver restraint module 210 to the steering wheel 204 differs from the bracket 70 and from the bracket 170 of the first and second invention embodiments, respectively A major point of difference is the provision of three attach points only, specifically mounting nuts 218, 220 and 222 for the attachment of the module 210 to the steering wheel 204. Bracket 216 is substantially identical to brackets 70 and 170 in respect of the placement of the four attach points 224, 226, 228 and 230 in the third embodiment for attaching the module 210 to the bracket 216. Bracket 216, in the application thereof, also is identical to the brackets 70 and 170 in the placement thereof in overlying relation with the inflator 24 with the flange 44 clamped between the bracket 216 and the reaction plate 22 of the module 210.

A tie cord 232 is attached to a tab 234 on bracket 216. The function of the tie cord 232 is the same as that of the tire cords 154 and 199 of the first and second embodiments, respectively, of the invention.

Figure 21:
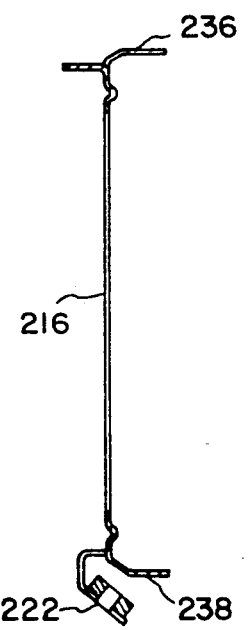
FIGS. 21 and 22 are views taken along the lines 21—21 and 22—22, respectively, of FIG. 20.
Figure 22:
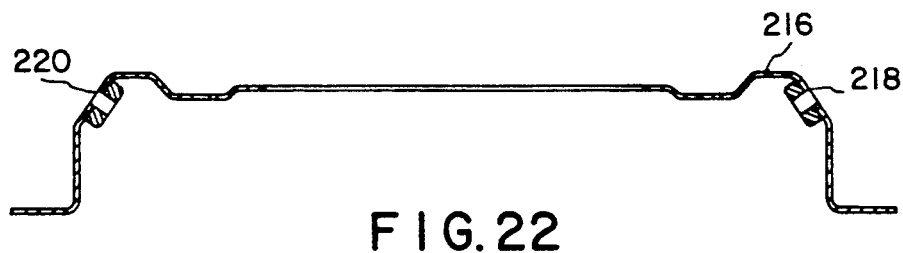

As seen in FIG. 21, bracket 216 includes tangs 236 and 238. These tangs serve a purpose that is substantially identical to the tangs 153 and 155 of the bracket 70 of the first invention embodiment and the tangs 201 and 203 of the bracket 170 of the second invention embodiment.

Thus, in accordance with the invention, there has been provided a simple and efficient means of fixedly attaching to the steering wheels of automotive vehicles differently styled driver restraint module assemblies while incorporating therein common major module components.

The invention enables most of the assembly for differently styled modules to be universalized or "commonized" thereby allowing for the use of more common production tooling, the assembly of all of the differently styled driver restraint modules on the same assembly line, and consequently, a reduction in the manufacturing cost.

Further, the invention provides for the use with each of the differently styled modules a different bracket that is individual thereto for the mounting thereof on an associated selectively different one of the steering wheels. Each bracket is characterized in having a common means of attachment to all of the differently styled module assemblies and in providing attachment points for mounting to the individually associated one of the steering wheels and in adapting to the styling locations for the various module assemblies for horn blowing or other driver actuated functions.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

What is claimed is:

1. Attach bracket means for fixedly mounting to a selected individual one of different vehicle steering wheels a selected individual one of different styled driver restraint module assemblies wherein all of said module assemblies incorporate common major components including a reaction plate, an inflator, and a folded air bag, said module assemblies being characterized in the provision thereof of a plurality of common module attach points that are located on the reaction plate, said different steering wheels having different spoke arrangements and attach points thereon for the attachment thereto of said attach bracket means with styling affecting the locations on each of said different steering wheels of said attach points, said attach bracket means being characterized in the provision thereon of a first plurality of common attach points that are common to the module attach points provided on each of said different styled module assemblies for the attachment thereto of said selected individual one of the different style module assemblies, said attach bracket means being further characterized in the selective provision thereon of a second plurality of attach points the locations of which are unique to the locations of said attach points provided on said selected individual one of the steering wheels on which said selected individual one of the different styled module assemblies is to be mounted, wherein said individual one of said different styled driver restraint module assemblies further includes a cover placed over said folded air bag, said cover having a side wall with an inner groove formed therein, wherein said reaction plate includes an upstanding wall having an inner wall surface which is positioned in close fitting engagement with said folded air bag with a distal edge of said upstanding wall being formed into a rolled-over lip that engages and is locked in mating engagement with said groove in said cover when said reaction plate and said folded air bag are pressed in place within said cover, and, wherein said bracket means are provided with tangs which in conjunction with said rolled-over lip keep said groove from slipping and hold said cover on said wall of said reaction plate during deployment of said air bag.

2. Attach bracket means for fixedly mounting to a selected individual one of different vehicle steering wheels a selected individual one of different styled driver restraint module assemblies wherein all of said module assemblies incorporate common major components including a reaction plate, an inflator, and a folded air bag, said module assemblies being characterized in the provision thereof of a plurality of common module attach points that are located on the reaction plate, said different steering wheels having different spoke arrangements and attach points thereon for the attachment thereto of said attach bracket means with styling affecting the locations on each of said different steering wheels of said attach points, said attach bracket means being characterized in the provision thereon of a first plurality of common attach points that are common to the module attach points provided on each of said different styled module assemblies for the attachment thereto of said selected individual one of the different style module assemblies, said attach bracket means being further characterized in the selective provision thereon of a second plurality of attach points the locations of which are unique to the locations of said attach points provided on said selected individual one of the steering wheels on which said selected individual one of the different styled module assemblies is to be mounted, wherein said inflator of said selected individual different styled driver restraint module assemblies includes a first portion and a second portion and a flange provided at a position intermediate said first portion and said second portion, wherein said reaction plate of said selected individual different styled driver restraint module assemblies includes an opening into which said first portion of said inflator is positioned, wherein said bracket means includes an opening into which said second portion of said inflator is positioned with said flange of said inflator positioned between said reaction plate and said bracket means, and wherein said common attach points that are located on said reaction plate include two at least that are common to two at least of the plurality of common attach points provided on said bracket means whereby to clamp said flange of said inflator between said reaction plate and said bracket means.

* * * * *